United States Patent
Koh

(10) Patent No.: US 6,300,982 B1
(45) Date of Patent: *Oct. 9, 2001

(54) FLAT PANEL DISPLAY APPARATUS AND METHOD HAVING ON-SCREEN DISPLAY FUNCTION

(75) Inventor: Hyung-Il Koh, Suwon (KR)

(73) Assignee: SamSung Electronics Co., Ltd., Suwon (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/188,221

(22) Filed: Nov. 9, 1998

(30) Foreign Application Priority Data

Nov. 8, 1997 (KR) .................................. 97-31469

(51) Int. Cl.$^7$ ...................................... H04M 5/50
(52) U.S. Cl. ........................ 348/569; 348/792; 345/213
(58) Field of Search .................... 348/569, 564, 348/750, 553, 556, 550, 792; 345/116, 141

(56) References Cited

U.S. PATENT DOCUMENTS

| | | |
|---|---|---|
| 4,492,979 | 1/1985 | Ikeda . |
| 4,962,427 * | 10/1990 | Lunn et al. ........................... 345/115 |
| 4,998,169 * | 3/1991 | Yoshioka .............................. 345/213 |
| 5,303,048 | 4/1994 | Chiok . |
| 5,774,189 | 6/1998 | Ishii et al. . |
| 5,796,392 | 8/1998 | Eglit . |
| 5,796,442 * | 8/1998 | Gove et al. ........................... 348/556 |
| 5,838,386 * | 11/1998 | Kim .................................... 348/569 |
| 5,926,174 * | 7/1999 | Shibamiya et al. ................... 345/213 |
| 5,990,982 * | 11/1999 | Gove et al. ........................... 348/750 |
| 6,055,023 * | 4/2000 | Rumreich et al. .................... 348/553 |
| 6,058,430 * | 5/2000 | Kaplan ................................. 709/245 |
| 6,091,397 * | 7/2000 | Lee ...................................... 345/147 |

* cited by examiner

Primary Examiner—Victor R. Kostak
(74) Attorney, Agent, or Firm—Robert E. Bushnell, Esq.

(57) ABSTRACT

A flat panel display apparatus including an on screen display (OSD) driver designed to operate in accordance with a system clock used in the flat panel display apparatus, thereby enabling the flat panel display apparatus to stably display an OSD picture. The apparatus includes a microcomputer for outputting OSD data detected from an input signal requiring an OSD operation along with OSD information stored therein, when the OSD operation is carried out, thereby controlling the OSD operation. The OSD driver receives the detected OSD data from the microcomputer and generates an OSD video signal corresponding to the received OSD data in sync with an OSD synchronizing signal applied thereto. The apparatus also includes a scaling unit for generating the OSD synchronizing signal, the scaling unit also serving to send a general video signal applied thereto to the flat panel display panel in a normal display operation while sending the OSD video signal to the flat panel display panel in a state entrained in the general video signal in accordance with the OSD information in the OSD display operation.

19 Claims, 2 Drawing Sheets

FLAT PANEL DISPLAY APPARATUS AND METHOD HAVING ON-SCREEN DISPLAY FUNCTION

CROSS-REFERENCE TO RELATED APPLICATION

This application make reference to, incorporates the same herein, and claims all benefits accruing under 35 U.S.C. §119 through my patent application Flat Panel Display Apparatus Having On-screen Display Function earlier filed on the Nov. 8, 1997 in the Korean Industrial Property Office, and there regularly assigned Serial No. 31469/1997.

BACKGROUND OF THE INVENTION

1. Field of the Invention

The present invention relates to a flat panel display apparatus, and more particularly to a flat panel display apparatus having an on-screen display (OSD) function.

2. Description of the Related Art

Display units of an analog system use an on-screen display driver appropriately designed to meet the characteristics of such display units. For instance, in the case of cathode ray tube monitors (CRT's), an appropriate OSD driver is used which is designed to include a phase locked loop (PLL) circuit adapted to generate an independent clock signal to be used as a clock for an operation of the OSD driver.

Meanwhile, where such an OSD driver, which is mainly adapted for monitors of an analog system, is used for flat panel display units, various problems are encountered. For example, although the OSD driver internally generates an independent clock signal to be used as a clock for an operation thereof, this clock is not necessarily synchronized with a system clock from a flat panel display unit to which the OSD driver is applied. In this case, undesirable noise is generated.

U.S. Pat. No. 4,492,979 entitled Synchronizing Circuit for Matrix Television Set to Ikeda discloses a synchronizing circuit suitable for a matrix television set using a flat display, such as comprised of liquid crystals, light emitting diodes or electro-luminescent elements in place of a cathode ray tube. It is disclosed that signals necessary for horizontal and vertical scanning, or the like, are obtained by dividing the signal from an oscillator circuit, wherein the frequency of the oscillator circuit does not equal that of the horizontal scanning signal, that is, in the order of 16 KHz. It is further disclosed phase comparison is performed on a horizontal synchronizing signal and a scanning signal, which is obtained by dividing the signal from the oscillator circuit, to apply negative feedback to the oscillator circuit whereby synchronization is performed.

U.S. Pat. No. 4,962,427 entitled TV Receiver Including Multistandard OSD to Lunn, et al. discloses a television receiver including a MPU and OSD circuitry on a single chip, wherein the OSD circuitry includes multisystem detection circuitry which counts the number of horizontal lines between vertical flyback pulses to determine the vertical frequency of the received standard signal and measures the time of a horizontal line using a fixed frequency signal to determine the horizontal frequency of the received standard signal and uses this information to control the outputs of a PLL to synchronize the receiver to the received standard. It is disclosed the PLL includes a VCO having a constant offset current applied to the control terminal to prevent alternating phases of the output control signal from the loop phase detector, which alternating phases cause jitter in the display.

U.S. Pat. No. 4,998,169 entitled Flat-panel Display Unit for Displaying Image Data from Personal Computer or the like to Yoshioka, discloses a flat-panel display unit including a basic clock pulse generator which produces a basic clock pulse having an oscillation frequency equal to an integer multiple of a dot clock-pulse frequency of the image data signal. The flat-panel display unit also includes a horizontal synchronizing signal detector which converts an input horizontal synchronizing signal to a pulse synchronous with the basic clock pulse, and a dot clock pulse generator which divides the basic clock pulse into clock pulses having a period equal to the dot clock pulses of the image data signal using an output of the horizontal synchronizing signal detector as a synchronous reset signal.

U.S. Pat. No. 5,303,048 entitled Circuit for Synchronizing an On-screen Display (OSD) on a Picture Screen to Chiok, discloses in a television receiver, a source of super sand-castle pulse is connected via a horizontal sync signal extracting first circuit and the vertical sync signal extracting second circuit to the horizontal and vertical sync input terminals of an OSD processor. It is disclosed that such a super sand-castle pulse provides good and stable relationship between H and V so that flicker and jitter on the screen during OSD do not occur.

U.S. Pat. No. 5,774,189 entitled An Screen Display to Ishii, discloses the OSD as including a plurality of holding circuits for outputting to a mixing circuit pixel data for characters or patterns synchronously with a horizontal synchronization signal, wherein the pixel data for the characters or patterns to be displayed are supplied to the holding circuits by a memory through a plurality of channels, the number of which is equal to the number of the holding circuits, so that a display signal for displaying the pixel data in a plurality of display areas is generated by the mixing circuit.

U.S. Pat. No. 5,796,392 entitled Method and Apparatus for Clock Recovery IN a Digital Display Unit to Eglit, discloses a clock recovery circuit in a digital display unit for recovering a time reference signal associated with analog display data. The clock recovery circuit is disclosed as including a phase-locked loop (PLL) implemented in digital domain and an analog filter to eliminate any undesirable frequencies from the output signal of the PLL. The PLL is disclosed as including independent control loops to track long term frequency drifts of the time reference signal and the transient phase differences respectively. It is disclosed by providing such independent control loops, the generated clock can be better synchronized with the time reference signal.

SUMMARY OF THE INVENTION

Therefore, the present invention has been made in view of the above mentioned problem, and an object of the invention is to provide a flat panel display apparatus including an OSD driver appropriately designed to enable the flat panel display apparatus to stably display an OSD picture.

In accordance with the present invention, this object and other objects of the present invention are accomplished by providing a flat panel display apparatus for displaying an image on a screen of a flat display panel, based on analog video signals and vertical and horizontal synchronizing signals received from a host, the flat panel display apparatus including: control means for outputting on screen display (OSD) data detected from an input signal requiring an OSD operation along with OSD information stored therein, when the OSD operation is carried out, thereby controlling the OSD operation; OSD video signal generating means for receiving the detected OSD data from the control means and generating an OSD video signal corresponding to the received OSD data in sync with an OSD synchronizing signal applied thereto; and means for generating the OSD synchronizing signal, the means also serving to send a general video signal applied thereto to the flat panel display panel in a normal display operation while sending the OSD video signal to the flat panel display panel in a state entrained in the general video signal in accordance with the OSD information in the OSD display operation.

Therefore, the present invention provides a flat panel display apparatus including an on screen display (OSD) driver designed to operate in accordance with a system clock used in the flat panel display apparatus, thereby enabling the flat panel display apparatus to stably display an OSD picture. The apparatus preferably includes a microcomputer for outputting OSD data detected from an input signal requiring an OSD operation along with OSD information stored therein, when the OSD operation is carried out, thereby controlling the OSD operation. Further, the apparatus preferably includes an OSD driver that receives the detected OSD data from the microcomputer and generates an OSD video signal corresponding to the received OSD data in sync with an OSD synchronizing signal applied thereto. The apparatus also preferably includes a scaling unit for generating the OSD synchronizing signal, the scaling unit also serving to send a general video signal applied thereto to the flat panel display panel in a normal display operation while sending the OSD video signal to the flat panel display panel in a state entrained in the general video signal in accordance with the OSD information in the OSD display operation.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENTS

Figure 1:
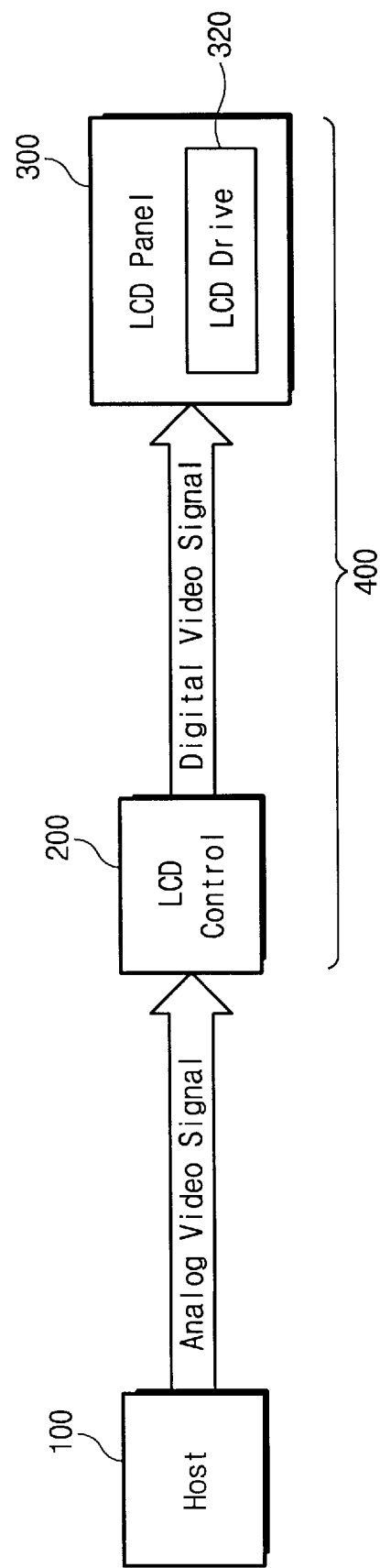
FIG. 1 is a block diagram schematically illustrating a basic circuit configuration of a liquid crystal display (LCD) apparatus as an example of a flat panel display apparatus to which the present invention is applicable.

FIG. 1 refers to a basic circuit configuration of an LCD apparatus which is a kind of a flat panel display apparatus. As show in FIG. 1, the LCD apparatus, which is denoted by the reference numeral 400, includes an LCD control unit 200 and an LCD panel 300. An LCD drive unit 320 is included in the LCD panel 300.

This LCD apparatus 400 having the above mentioned configuration is coupled to a host 100 such as the system unit of a personal computer system in order to receive signals of an analog form from the host 100. For example, analog video signals for CRT monitors, and other required signals such as vertical and horizontal synchronizing signals are input at the LCD apparatus 400. The host 100 can include a central processing unit (CPU), a hard disk drive (HDD), a floppy disk drive (FDD), and a video board, etc.

The LCD control unit 200 converts the input analog signals into corresponding digital signals which are, in turn, applied to the LCD drive unit 320. Based on the applied digital signals, the LCD drive unit 320 operates to display a corresponding image on the screen of the LCD panel 300.

Figure 2:
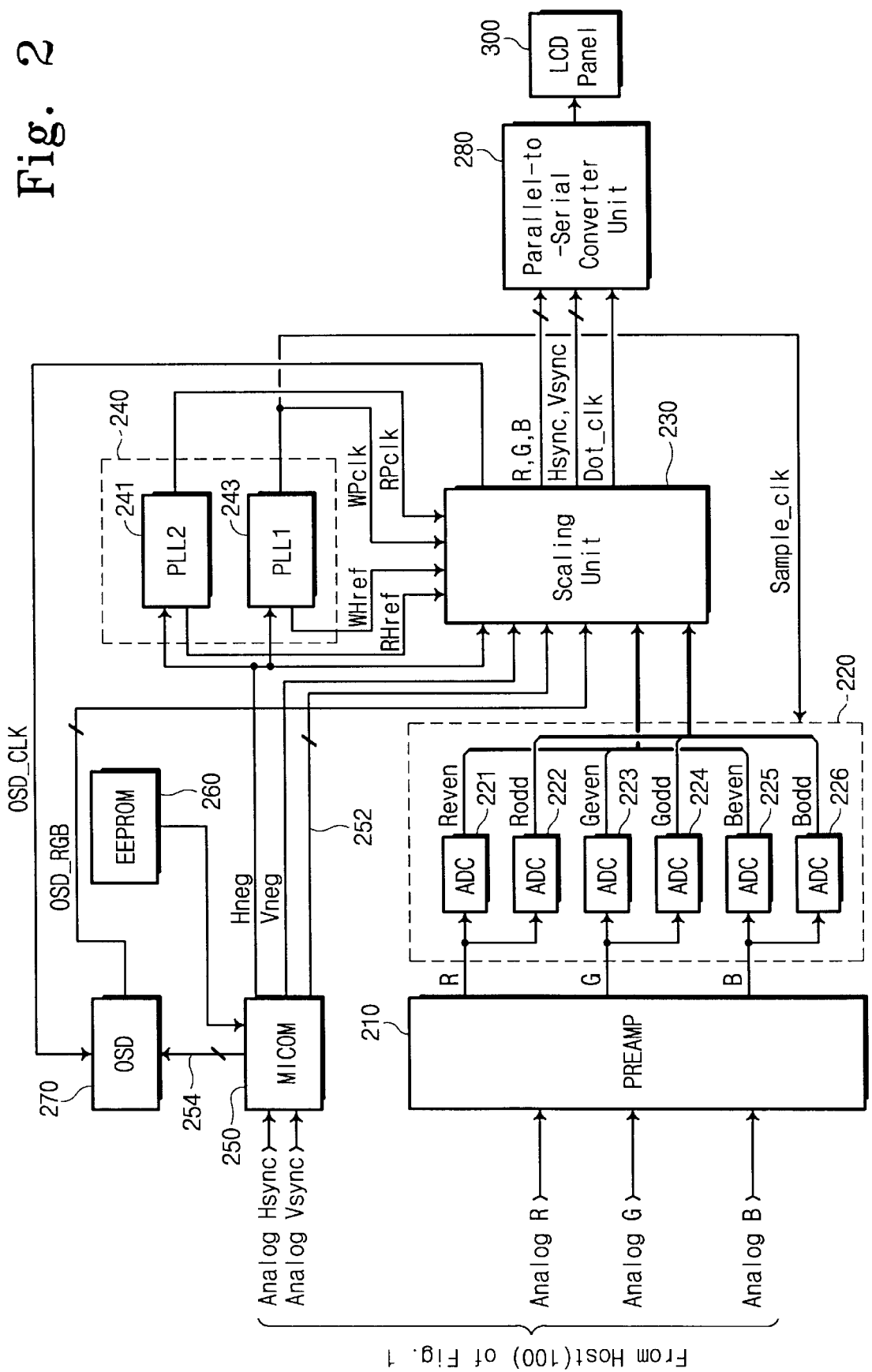
FIG. 2 is a block diagram illustrating an LCD apparatus having an OSD function in accordance with an embodiment of the present invention.

Referring to FIG. 2, an LCD apparatus according to an embodiment of the present invention is illustrated which has a basic configuration as shown in FIG. 1, but incorporated with a circuit having an OSD function.

As shown in FIG. 2, the LCD apparatus having an OSD function in accordance with the present invention mainly includes a pre-amplifier unit 210, an analog-digital converter unit 220, a scaling engine 230, a PLL circuit unit 240, a microcomputer (MICOM) 250, an EEPROM 260, an OSD driver 270, and a parallel-to-serial converter unit 280.

The EEPROM 260 is stored with information associated with the LCD apparatus as, for example, information about manufacturer, product name, and resolution supported. The EEPROM 260 provides such information to an external unit supporting a plug and play (PNP) function when the external unit needs the information.

The pre-amplifier unit 210 amplifies analog video signals of red (R), green (G) and blue (B) colors applied from the host 100 thereto. The amplified analog R, G and B video signals are applied to associated ones of analog-digital converters 221 to 226 included in the analog-digital converter unit 220, respectively.

The analog-digital converters 221 to 226 of the analog-digital converter unit 220 convert the analog R, G and B video signals applied thereto into corresponding digital R, G and B video signals Reven, Rodd, Geven, Godd, Beven, and Bodd, respectively.

The microcomputer 250 receives horizontal and vertical synchronizing signals Hsync and Vsync from the host 100, thereby outputting vertical and horizontal synchronizing signals having specific polarities, respectively. For instance, where the LCD apparatus has operation characteristics 121 to be synchronized with vertical and horizontal synchronizing signals of a negative polarity, it generates negative horizontal and vertical synchronizing signals Hneg and Vneg, respectively. The microcomputer 250 also determines the video resolution currently supported by the host 100 by detecting respective frequencies of the analog horizontal and vertical synchronizing signals Hsync and Vsync. After this determination, the microcomputer 250 sends associated information to the scaling unit 230 via a first I$^2$C bus 252.

The PLL circuit unit 240, which includes of a first PLL circuit 241 and a second PLL circuit 243, is adapted to receive the negative horizontal synchronizing signal Hneg from the microcomputer 250, thereby generating horizontal reference frequency signals WHref and RHref respectively required for write/read operations, along with pixel clocks WPclk and RPclk respectively resulting from the write/read operations. These signals are applied to the scaling unit 230. The pixel clock WPclk resulting from the write operation is also applied, as a sampling clock Sample_clk, to the analog-digital converter unit 220.

In response to the control signals from the PLL circuit unit 240, the scaling unit 230 receives the digital video signals output from the analog-digital converter unit 220 and stores them in a line memory (not shown) included therein. The scaling unit 230 also receives the horizontal and vertical synchronizing signals Hneg and Vneg from the microcomputer 250, as illustrated in FIG. 2. The scaling unit 230 also executes a scaling operation when it is determined, based on information about resolution from the microcomputer 250, that the scaling operation is required.

Assuming that video signals supplied from the host 100 are those for a 640×480 VGA mode whereas the LCD apparatus 400 (FIG. 1) supports the resolution for a 1024×768 XGA mode, it is impossible to display those video signals of the 640×480 VGA mode on the whole screen of the LCD panel 300 of the 1024×768 XGA mode. Such an incompatibility is solved by an appropriate scaling operation of the scaling unit 230. In this regard, digital video signals R, G and B output from the scaling unit 230 are video signals suitable for the 1024×768 XGA mode.

The parallel-to-serial converter unit 280 converts the digital video signals R, G and B, horizontal and vertical synchronizing signals Hsync and Vsync, and dot clocks Dot_clk sent from the scaling unit 230 into a serial signal which is, in turn, applied to the LCD drive unit 320 of the LCD panel 300 (FIG. 1). Thus, an image is displayed on the screen of the LCD panel 300. On the other hand, when a signal associated with an OSD function is input at the above mentioned LCD apparatus 400 (FIG. 1), the microcomputer 250 sends data associated with the input signal to the OSD driver 270 via a second $I^2C$ bus 254. The microcomputer 250 also sends OSD information, such as the position of an OSD picture or OSD image, output currently generated, on the screen, to the scaling unit 230 via the first $I^2C$ bus 252.

The OSD driver 270 operates in sync with the OSD clock OSDclk from the scaling unit 230. Based on the data from the microcomputer 250, the OSD driver 270 converts data stored in its internal character ROMs into an OSD video signal OSD_RGB which is, in turn, applied to the scaling unit 230. Based on the OSD information from the microcomputer 250, the scaling unit 230 stores the OSD video signal OSD_RGB at a corresponding memory location in its internal line memory. Accordingly, an OSD picture is displayed on a corresponding portion of the screen of the LCD panel 300. The OSD driver 270 can be a unit "MC 141544DW" manufactured by Motorola Company, for example. A detailed specification of the unit "MC141544DW" is made or described in the Semiconductor Technical Data Book, Rev 0.0 Feb. 28, 1997 published by Motorola Company. Also, other OSD drivers for flat panel display appliances similar to the unit "MC141544DW" are also easily applicable to the present invention.

The above mentioned OSD display function can be used in the following cases. For example, where a key input signal from a separate control key included in the LCD apparatus is generated, the microcomputer 250 detects this key input, thereby carrying out a control to display a corresponding OSD picture or OSD image. Otherwise, where the host 100 requires to output an OSD picture, the microcomputer 250 detects such a requirement, thereby carrying out a control to display a corresponding OSD picture.

Although the present invention has been described in conjunction with embodiments associated with an application to LCD appliances, it is also applicable to other kinds or type of flat panel display appliances.

As apparent from the above description, the present invention provides a flat panel display apparatus including an OSD driver designed to operate in accordance with a system clock used in the flat panel display apparatus, thereby enabling the flat panel display apparatus to stably display an OSD picture or OSD image.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the scope thereof. Therefore, it is intended that the present invention not be limited to the particular embodiments disclosed as the best mode contemplated for carrying our the present invention, but that the present invention includes all embodiments falling within the scope of the appended claims.

What is claimed is:

1. A method for displaying an image on a flat panel display, comprising the steps of:

outputting on screen display (OSD) data detected from an input signal and on screen display (OSD) information for controlling an on screen display (OSD) display operation;

generating by a sampling clock signal generating means for the flat panel display a system clock for the flat panel display;

generating an on screen display (OSD) video signal corresponding to the on screen display (OSD) data in synchronism with an on screen display (OSD) clock signal, the on screen display (OSD) clock signal being generated in accordance with the system clock for the flat panel display to stably display an image corresponding to the on screen display (OSD) video signal; and sending a general video signal to the flat panel display in a normal display operation and sending the on screen display (OSD) video signal to the flat panel display in a state entrained in the general video signal in accordance with the on screen display (OSD) information in the on screen display (OSD) display operation.

2. The method as claimed in claim 1, further comprised of a microcomputer outputting the on screen display (OSD) data and the on screen display (OSD) information, an on screen display (OSD) driver generating the on screen display (OSD) video signal corresponding to the on screen display (OSD) data, and a scaling unit generating the on screen display (OSD) clock signal in accordance with the system clock for the flat panel display, sending the general video signal to the flat panel display and sending the on screen display (OSD) video signal to the flat panel display in the state entrained in the general video signal.

3. The method as claimed in claim 1, further comprised of the flat panel display comprising a liquid crystal display (LCD) panel.

4. A flat panel display apparatus for displaying an image on a display panel of a flat panel display, based on analog video signals and vertical and horizontal synchronizing signals received from a host, comprising:

a control means for outputting on screen display (OSD) data detected from an input signal requiring an on screen display (OSD) display operation along with on screen display (OSD) information, when the on screen display (OSD) display operation is carried out, thereby controlling the on screen display (OSD) display operation;

an on screen display (OSD) video signal generating means for receiving the detected on screen display (OSD) data from the control means, and for generating an on screen display (OSD) video signal corresponding to the received on screen display (OSD) data in synchronism with an on screen display (OSD) clock signal, the on screen display (OSD) clock signal being generated in accordance with a system clock for the flat panel display apparatus to stably display an image corresponding to the on screen display (OSD) video signal;

a video signal converting means for converting the analog video signals into digital video signals;

a sampling clock signal generating means for generating the system clock for the flat panel display apparatus, the sampling clock signal generating means for generating read and write pixel clock signals in response to a horizontal synchronizing signal from the control means, the write pixel clock signal being a sampling clock signal for sampling a digital video signal; and a means, that receives vertical and horizontal synchronizing signals from the control means and the write pixel clock signal from said sampling clock signal generating means, for generating the on screen display (OSD) clock signal in accordance with the system clock for the flat panel display apparatus, for scaling a resolution of the digital video signal, for sending the digital video signal to the display panel in a normal display operation, and for sending the on screen display (OSD) video signal to the display panel in a state entrained in the digital video signal in accordance with the on screen display (OSD) information in the on screen display (OSD) display operation.

5. The flat panel display apparatus as claimed in claim 4, further comprised of said control means comprising a microcomputer, said on screen display (OSD) video signal generating means comprising an on screen display (OSD) driver, and said means for generating the on screen display (OSD) clock signal, for scaling the resolution of the digital video signal, for sending the digital video signal, and for sending the on screen display (OSD) video signal comprising a scaling unit.

6. The flat panel display apparatus as claimed in claim 4, further comprised of said video signal converting means comprising a pre-amplifying circuit for amplifying the analog video signals including analog red, green and blue video signals, and a plurality of analog-digital converters for respectively converting the analog red, green and blue video signals into corresponding digital red, green and blue video signals.

7. A flat panel display apparatus for displaying an image on a display panel of a flat panel display, based on analog video signals and vertical and horizontal synchronizing signals received from a host, comprising:

a control means for outputting on screen display (OSD) data detected from an input signal requiring an on screen display (OSD) display operation along with on screen display (OSD) information, when the on screen display (OSD) display operation is carried out, thereby controlling the on screen display (OSD) display operation;

an on screen display (OSD) video signal generating means for receiving the detected on screen display (OSD) data from the control means, and for generating an on screen display (OSD) video signal corresponding to the received on screen display (OSD) data in synchronism with an on screen display (OSD) clock signal in accordance with a system clock for the flat panel display apparatus;

a video signal converting means for converting the analog video signals into digital video signals;

a sampling clock signal generating means for generating read and write pixel clock signals in response to a horizontal synchronizing signal from the control means, the write pixel clock signal being a sampling clock signal for sampling a digital video signal, said sampling clock signal generating means comprising a plurality of phase-locked loop (PLL) circuits for respectively generating the read and write pixel clock signals; and a means, that receives vertical and horizontal synchronizing signals from the control means and the write pixel clock signal from said sampling clock signal generating means, for generating the on screen display (OSD) clock signal, for scaling a resolution of the digital video signal, for sending the digital video signal to the display panel in a normal display operation, and for sending the on screen display (OSD) video signal to the display panel in a state entrained in the digital video signal in accordance with the on screen display (OSD) information in the on screen display (OSD) display operation.

8. The flat panel display apparatus as claimed in claim 4, further comprised of the flat panel display comprising a liquid crystal display (LCD) panel.

9. The flat panel display apparatus as claimed in claim 4, further comprised of the host being a system unit of a personal computer system including a central processing unit (CPU).

10. The flat panel display apparatus as claimed in claim 4, further comprised of the on screen display (OSD) information comprising information as to the position of an on screen display (OSD) image.

11. A flat panel display apparatus for displaying an image on a display panel of a flat panel display, based on analog video signals and vertical and horizontal synchronizing signals received from a host, comprising:

a controller for outputting on screen display (OSD) data detected from an input signal and on screen display (OSD) information for controlling an on screen display (OSD) display operation;

an on screen display (OSD) driver for receiving the detected on screen display (OSD) data from the controller, and for generating an on screen display (OSD) video signal corresponding to the received on screen display (OSD) data in synchronism with an on screen display (OSD) clock signal, the on screen display (OSD) clock signal being generated in accordance with a system clock for the flat panel display apparatus to stably display and image corresponding to the on screen display (OSD) video signal;

a video signal converting circuit for converting the analog video signals into digital video signals;

a sampling clock signal generating circuit for generating the system clock for the flat panel display apparatus, the sampling clock signal generating circuit for generating read and write pixel clock signals in response to a horizontal synchronizing signal, the write pixel clock signal being a sampling clock signal for sampling a digital video signal; and a scaling unit, that receives vertical and horizontal synchronizing signals from the controller and the write pixel clock signal from the sampling clock signal generating circuit, for generating the on screen display (OSD) clock signal in accordance with the system clock for the flat panel display apparatus, for scaling a resolution of the digital video signal, for sending the digital video signal to the display panel in a normal display operation, and for sending the on screen display (OSD) video signal to the display panel in a state entrained in the digital video signal in accordance with the on screen display (OSD) information in the on screen display (OSD) display operation.

12. The flat panel display apparatus as claimed in claim 11, further comprised of said video signal converting circuit comprising a pre-amplifier for amplifying the analog video signals including analog red, green and blue video signals, and a plurality of analog-digital converters for respectively converting the analog red, green and blue video signals into corresponding digital red, green and blue video signals.

13. A flat panel display apparatus for displaying an image on a display panel of a flat panel display, based on analog video signals and vertical and horizontal synchronizing signals received from a host, comprising:

a controller for outputting on screen display (OSD) data detected from an input signal and on screen display (OSD) information for controlling an on screen display (OSD) display operation;

an on screen display (OSD) driver for receiving the detected on screen display (OSD) data from the controller, and for generating an on screen display (OSD) video signal corresponding to the received on screen display (OSD) data in synchronism with an on screen display (OSD) clock signal in accordance with a system clock for the flat panel display apparatus;

a video signal converting circuit for converting the analog video signals into digital video signals;

a sampling clock signal generating circuit for generating read and write pixel clock signals in response to a horizontal synchronizing signal, the write pixel clock signal being a sampling clock signal for sampling a digital video signal, said sampling clock signal generating circuit comprising a plurality of phase-locked loop (PLL) circuits for respectively generating the read and write pixel clock signals; and a scaling unit, that receives vertical and horizontal synchronizing signals from the controller and the write pixel clock signal from the sampling clock signal generating circuit, for generating the on screen display (OSD) clock signal, for scaling a resolution of the digital video signal, for sending the digital video signal to the display panel in a normal display operation, and for sending the on screen display (OSD) video signal to the display panel in a state entrained in the digital video signal in accordance with the on screen display (OSD) information in the on screen display (OSD) display operation.

14. The flat panel display apparatus as claimed in claim 11, further comprised of the flat panel display comprising a liquid crystal display (LCD) panel.

15. The flat panel display apparatus as claimed in claim 11, further comprised of the host being a system unit of a personal computer system including a central processing unit (CPU).

16. The flat panel display apparatus as claimed in claim 11 further comprised of the on screen display (OSD) information comprising information as to the position of an on screen display (OSD) image.

17. The method as claimed in claim 1, further comprised of the sampling clock signal generating means comprising a plurality of phase-locked loop (PLL) circuits for respectively generating read and write pixel clock signals.

18. The flat panel display apparatus as claimed in claim 7, further comprised of the write pixel clock signal being supplied to said video signal converting means and to said means for scaling the resolution of the digital video signal.

19. The flat panel display apparatus as claimed in claim 13, further comprised of the write pixel clock signal being supplied to said video signal converting circuit and to said scaling unit.

* * * * *